Sept. 2, 1924.
M. E. INFIORATI, JR
1,507,288
BROACHING MACHINE
Filed Sept. 12, 1922  3 Sheets-Sheet 2
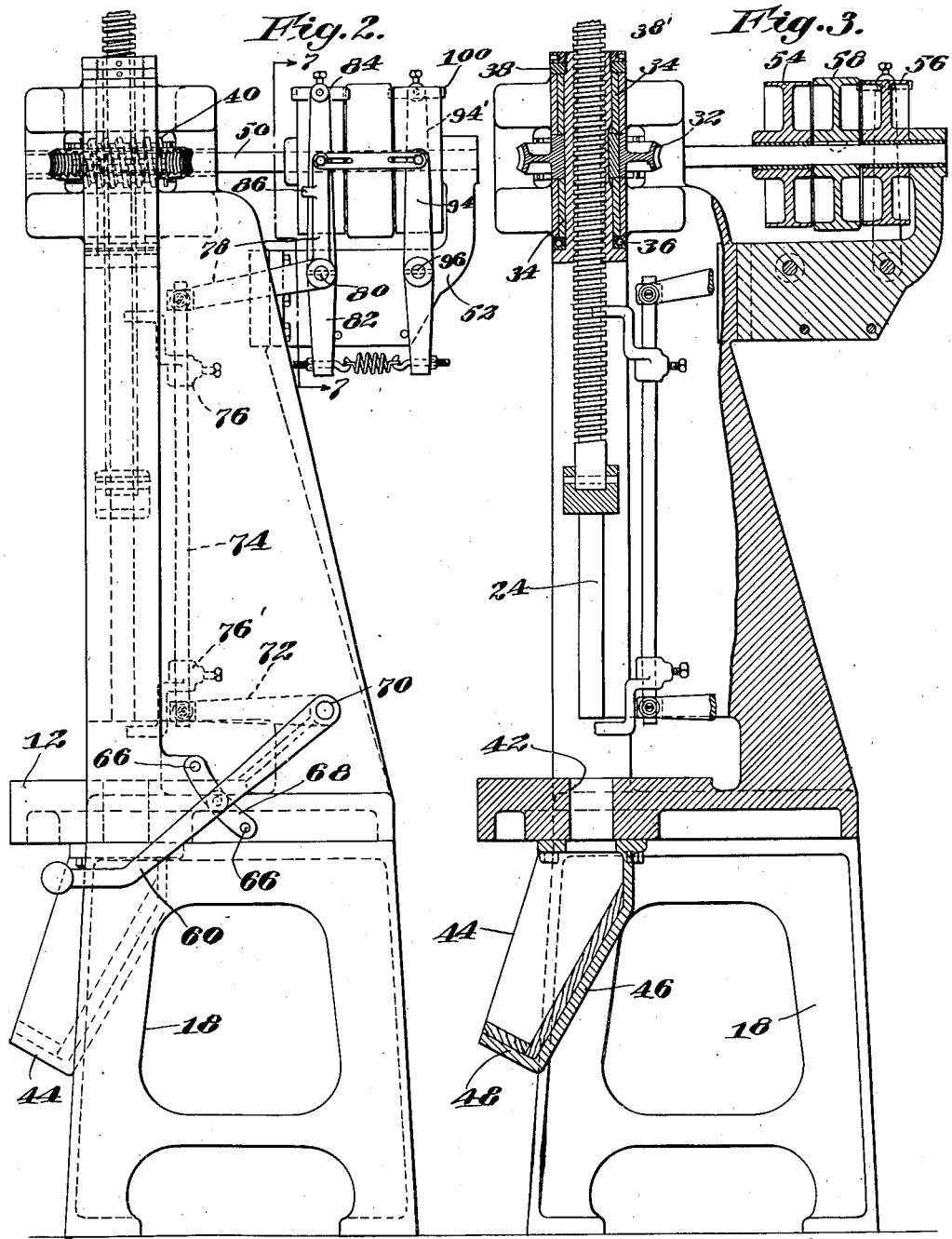
Inventor
Matteo E. Infiorati Jr.
by
Mitchell, Chadwick & Kent Attorneys.

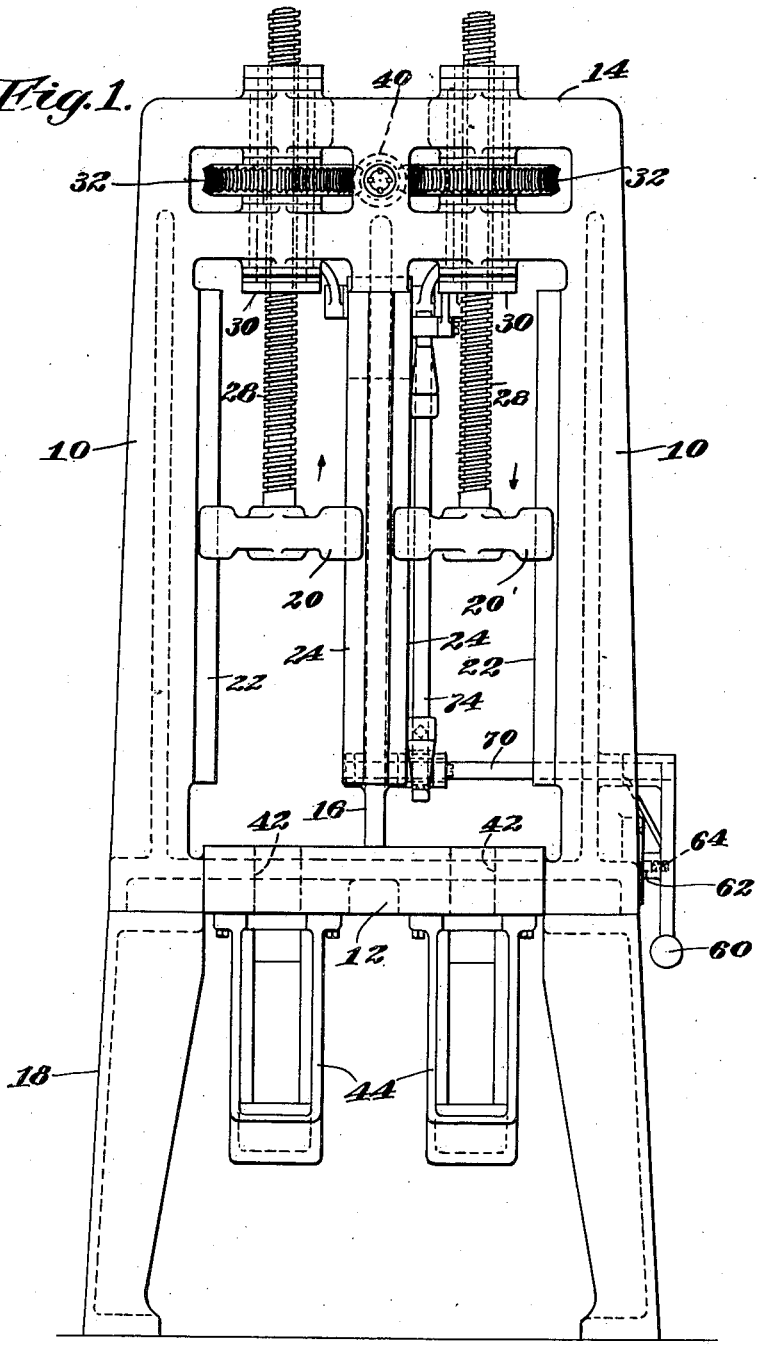

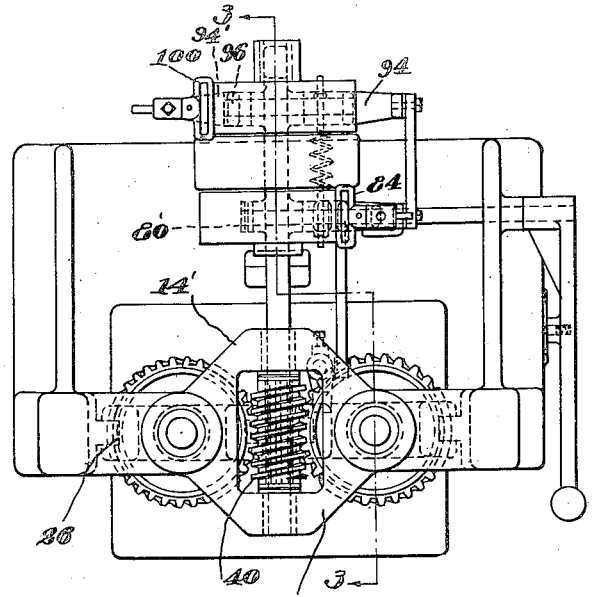

Patented Sept. 2, 1924.

1,507,288

UNITED STATES PATENT OFFICE.

MATTEO E. INFIORATI, JR., OF NEW LONDON, CONNECTICUT, ASSIGNOR TO THE J. N. LAPOINTE COMPANY, OF NEW LONDON, CONNECTICUT, A CORPORATION OF MAINE.

BROACHING MACHINE.

Application filed September 12, 1922. Serial No. 587,677.

*To all whom it may concern:*

Be it known that I, MATTEO E. INFIORATI, Jr., citizen of the United States, residing at New London, in the county of New London and State of Connecticut, have invented certain new and useful Improvements in Broaching Machines, of which the following is a specification.

This invention relates to broaching machines. More especially it relates to push broaching machines. It is an object of the invention to provide a machine of this class in which a succession of duplicate pieces can be broached, for commercial production with economy of time, machines and labor expense. As hitherto practiced in such manufacture the machine is idle while the operator is removing the old work and attaching the new, and the operator is idle while the machine is performing both its working and return strokes. Considerable time is thus lost and particularly by the operator, for the speed of feed of the machine during the working stroke is necessarily slow because of the nature of the operation performed.

An important object of the invention is to provide means whereby both the operator and the machine may perform their respective functions simultaneously, thus both saving time and increasing the production of the machine. To this end it is intended to provide means for holding different pieces of work and providing a plurality of broaching heads for causing separate tools to operate upon the different pieces of work. An incidental object is for the tool to clear itself of the work. To this end a suitable receptacle is arranged into which the tool may pass harmlessly by gravity and be retained within easy reach of the operator. A further object is the provision of apparatus in which the tool can be set by simple means; the work set instantly and supported adequately during the stroke; and the feeding means controlled so that a working stroke of one broach head and a return stroke of another are effected simultaneously. Still another object is the provision of belt shifting apparatus whereby the feed of the machine in either direction may be manually started and may either be stopped in the same manner or be automatically stopped at any predetermined point.

These objects are accomplished by providing a machine with a work holding table adapted to be operated upon at two adjacent places by separate sets of tools, and providing two broaching heads one arranged for forcing a tool through a piece of work at each location. On the form illustrated the broach driving column is of the screw type. Each head is fast to a non-rotatable vertical feed screw which is forced longitudinally upward or downward by the rotation of a nut engaging it. Both of these nuts mesh with a single worm interposed between them, so that upon rotation of the worm the nuts are turned in opposite directions, and this causes movement of the feed screws and broach heads in opposite directions of travel.

In this manner one head is descending pushing the tools through new work while the other head is ascending away from finished work. A soft-lined receptacle under the work holding table is in alignment with a hole in the table, through which the tool drops from its work when it has passed through. This saves the time lost in bringing the tool upward to its initial position by power, for immediately the workman may lift the tool by hand and put it over the other piece of work, under the other head; and then as the machine is reversed and the first head starts upward without the tool the second head starts down, driving the tool through the second piece of work. The finished work may be taken off of the first hole or out of the holding fixture thereover, if any, and new work substituted under the first head ready for the tool to be set on it as soon as it has finished the work under the second head. The repetition of these operations keeps both the machine and operator busy at the same time, with the machine operating practically continuously with a single broach.

However, the machine may be used in various other ways, as desired, as for example to use one head for a first cut and the other for a finishing broach.

In the driving and reversing arrangement illustrated for attaining this continuous operation a worm that drives the geared nuts is fast on a shaft which carries three adjacent belt pulleys, the middle one of which is fast to the shaft, and the others of which are loose thereon. The driving belts, being spread and running oppositely on the two loose pulleys when the machine is idle, are individually shifted to the center or tight pulley by a system of linkage, operated by a hand lever and are automatically returned after predetermined travel of the broach head.

There is shown in the accompanying drawings a machine illustrative of the principles of the present invention. It is intended that the patent shall cover by suitable expression in the appended claims whatever features of patentable novelty exist in the invention disclosed.

In the drawings:

Figure 1 is a front elevation of a push press broaching machine constructed in accordance with the present invention;

Figure 2 is a side elevation of the same, as viewed from the right in Figure 1;

Figure 3 is a side elevation partly in section, as on line 3—3 of Figure 4;

Figure 4 is a plan;

Figures 5 and 6 are side elevations showing different positions of the belt shifting apparatus; and Figure 7 is a front elevation of this apparatus in section on line 7—7 of Figure 2.

Referring to the drawings of the particular machine illustrated the frame comprises side uprights 10 joined by a horizontal table and base plate 12 at the bottom and cross member 14 at the top, together with a central reinforcing and supporting web plate 16 extending down the back. This frame may be set upon any suitable bench or standards 18. Each broach head 20, 20' is between a guide way 22 on a side member 10 and a guide on the forward edge 24 of the central web 16, there being side grooves 26 in these broach heads into which the guideways fit and so prevent rotation. Attached to and vertically suspending each head is a large screw 28 which at the top threads through a long cylindrical nut 30 rotatably supported in the top cross member of the frame. On this nut is keyed a worm gear 32; and suitable journals, bushings 34, and thrust ball bearings 36 are provided, with a pair of nuts or threaded collars, 38, 38' by which the nut, bushings, and gears are kept in position. The worm gears set on vertical axes mesh with the horizontal worm 40 between them, one gear being driven in a clockwise direction, the other counterclockwise. Since the threads on the screws are alike this causes the broach heads to move oppositely to each other, and one head can be at work forcing a tool downward through the work, while the other head is being raised from finished work. The work may, if necessary, be held in any ordinary or suitable fixtures, such as may be bolted or clamped to the machine table 12; but it is a feature that the work may in many cases be simply laid loosely on the table and be centered by the tool and held by friction when the head descends. A hole 42 in the table, directly under the broach head is large enough to let the broach pass through and drop into a receptacle 44 fastened to the under side of the table 12. This receptacle has open front, inclined back 46, and bottom 48 so arranged that the tool will tip backward and be retained upright therein, accessible to the operator. This receptacle is preferably lined with wood or other soft material from which the edges of the broach will suffer no harm.

The driving worm 40 is on a horizontal shaft 50, carrying three pulleys, of which the outside two 54 and 56 are loose thereon and the middle one 58 is tight. Two belts (not shown), one straight and the other crossed, run oppositely on the two loose pulleys when the machine is idle. Upon the shifting of either belt to the middle pulley the worm shaft 50 is rotated in accordance with the direction of travel of the belt so shifted.

The shifting may be accomplished by any suitable means; but it is a feature to provide a combined hand and automatic control. To this end there is a hand lever 60 provided with a detent pin 62 which acting as a latch under pressure of a coiled spring 64 engages holes 66 in a fixed sector plate 68 so that when the lever is moved by the operator it will normally be stopped by the detent pin at a predetermined position in its swing, which is correct for the belt drive, and held there until dislodged by sufficient force, such as may be applied by the broaching head, or if desired, by hand at the end of desired travel. The fulcrum of this hand lever is shaft 70, upon which it is fixed, and to which its other arm 72 is fast. The latter is connected to a vertical rod 74 just back of one of the broach heads, and upon which are dogs, 76, 76' adjustable in position, in the path of the broach head at its upper and lower limits of travel. The said vertical rod is a link supported at bottom on said arm 72 and at top on the horizontal arm of a bell crank lever 78 whose fulcrum is a shaft 80 journaled in a supporting fixture 52 on the said rear web 16, on an axis perpendicular to that of the worm shaft and pulleys, so that the vertical arm of this bell crank swings alongside the drive shaft in a direction to shift the belts. Such swinging occurs whenever the rod 74 is moved by the handle 60 or by either dog 76 or 76'. However, the bell crank 78 does not shift belts directly. Instead it operates the belt shifters 84 and 100 through lost motion connections, the former when handle 60 and arm 72 rises moving the belt from pulley 54, which can drive the broach head down, and the latter, when said handle and arm go down, moving the belt from pulley 56 which can drive the broach head up. Moreover it does not positively shift either of these belts off from the drive pulley 58, that function being performed by power which is stored in a spring 88 when the belt is moved to the drive pulley by the bell crank 78, which spring is too weak to act except when the detent 62 is disengaged as herein explained, which occurs whenever the bell crank is by hand or machine power swung back from either setting position. Normally the belt is shifted to driving position by the hand of the operator, and is shifted from it by the power of said spring, and therefore is always moved with a suitably gentle touch, while the speed at which the machine throws the bell crank out of the way does not affect the belt. Moreover, by this said device, details of which are hereinafter described, it is provided that each belt tends always to return, to and stay on its loose pulley, whenever not latched on the drive pulley, and this makes it safe to have the lost motion in its connections by which the arrangement is characterized, which permits of using single width loose pulleys, and has the other advantages that pertain to it. The belt cage 84 is on lever 82 which extends thence down to below its loose fulcrum on shaft 80 (which shaft is also the fulcrum of the bell crank 78). Above its fulcrum it is engaged and moved at times by the lug 86 on bell crank lever 78, when the latter pushes it into driving position as seen in Figure 5. And below the fulcrum it is attached to spring 88 which constantly pulls it toward its loose pulley position seen in Figures 2 and 6, and actually moves it thither whenever the lug 86 permits.

The belt cage 100 is on the other side of the pulley 56, and is more or less concealed by other parts in the drawing. In Figure 7 it is seen extending downward to its fulcrum on shaft 96, which in Figure 7 is directly behind shaft 80, except that shaft 96 extends a little further to the left than shaft 80, which ends at collar 80'. This fulcrum 96 extends through to the right side of the pulleys and there has arms marked 94 and 94' the former extending downward to the spring 88 and upward to the link 92. These would ordinarily be mostly concealed by levers 82 and 78 in Fig. 7, but for the sake of making them visible they are represented as being slightly larger than 82 and curved on different lines. This lever 94 is actuated by link 92, to set its belt in driving position, when said link is pulled by the bell crank lever 78, on which occassions it shifts from the position of Fig. 2 to that of Fig. 6; and is actuated by spring 88 to restore it to the loose pulley whenever the bell crank pull on link 92 is relaxed by the return of that bell crank to the position of Fig. 2. The lost motion provided by either slot in this link permits the bell crank to move to its position for drive in opposite direction without moving the belt on its pulley 56. In the shifting device it will be seen that the connection of the shift operating devices, 60, 76, 76' to each be't cage, 84 or 100, has lost motion when it is moving either belt toward the other, so that the other is not simultaneously pushed or pulled thereby in the same direction. Stop pins 90 prevent any such motion occurring accidentally or as a result of the pull of the spring 88.

In operation, the parts being at rest as in Fig. 2, the operator sets a piece of work on the table 12 with its hole over the hole 42 and drops a push broach down into it. The leading end of the broach automatically centers that tool in the hole under the broach head 20'. Then he raises the lever 60 by hand. This throws lug 86 to the right (Fig. 2) and produces the setting shown in Fig. 5, the pin 106 moving freely in the slot in link 92, and imparting no motion to that link. This starts the down drive of the broach head 20', and the upstroke of 20. When the head 20' reaches a predetermined point, set for engagement with lug 76' just after it has descended low enough for the last tooth of the broach to be forced through the work, thereby letting the broach fall into box 44, its engagement with said lug depresses rod 74, pulling the bell crank lever back to Fig. 2 position and in so doing pulling lug 86 away from lever 82. This allows spring 88 to pull the belt lever 82 back to the loose pulley without affecting belt lever 94; and the machine stops. The operator instantly picks up the broach and drops it into a piece of work which he has meanwhile set over hole 42 under head 20 and depresses the lever 60. As the pins 106, 108 are already at the opposite extremities of the slots provided in link 92, the pull of the bell crank 78 which accompanies this depresssion pulls pin 108 and lever 94 to the left (Fig. 2) to the position of Fig. 6; with lug 78 moving away from lever 82 and therefore not affecting it. The head 20 starts down; head 20' starts up; and the operator begins to change the work under the latter. Engagement of head 20' with lug 76 restores the bell crank to the position of Fig. 2 and stops the machine. Either one of the slots in link 92 may be omitted.

The mechanism described provides a machine that cannot be started except by the operator, but which may be stopped either by him or by the automatic mechanical means. The operator need not concern himself with the stopping, and can give his entire attention to changing the work and shifting the tool, while the machine is in operation, so that both he and the machine are working simultaneously. This insures that there shall be no inadvertent over-travel, with damage that might result therefrom. In consequence the machine is easy to operate, and notwithstanding its simple make-up is highly efficient.

Although the mechanism described for operating the moving columns, whose lower ends constitute the press heads, is described as of the nut and screw type, it is obvious that other standard or suitable types of drive may be employed.

I claim as my invention:

1. A broaching machine comprising the combination of two reciprocating heads adapted for pressing downward; means whereby they move simultaneously and oppositely; a work holding plate under each; and a soft surfaced receptacle under each adapted to catch and hold a broaching tool that has been pressed through the work by the head.

2. A broaching machine having a horizontal table adapted to support work, there being an opening in said table in alignment with the path of the tool through which a broaching tool can descend; a soft-surfaced receptacle under the table adapted to receive the tool; and means for pushing the tool vertically toward the table and through the work supported thereon; said receptacle having an open front, an inclined back located under the hole so that the tool strikes it, and a bottom; the inclination of the back being such that the tool slides thereon to the bottom and is held up above the horizontal thereby while its end is resting on the bottom.

3. A broaching machine having a horizontal table, adapted in two adjacent locations to support work, there being at each location an opening in said table, in alignment with the path of the tool into which a broaching tool can descend; and a plurality of means reciprocating vertically and moving simultaneously in opposite directions for pushing a tool vertically through work at the said locations alternately.

4. A broaching machine having a pair of vertically reciprocating, oppositely moving columns having push heads side by side, a horizontal drive shaft arranged between the columns; intermeshing means whereby it operates both columns simultaneously; and means for reversing the rotative direction of said driving shaft.

5. A push broach press comprising two vertically reciprocating heads, and means to guide and to drive them with opposite strokes, combined with control mechanism comprising a vertical element having a lug adapted to be engaged and moved by the stroke and having a handle for the manual moving of the said element farther in the same direction; and mechanism whereby the movement of the said element by the lug disconnects the power, and the said further movement connects power in reverse direction.

6. A press adapted for operating push broaches comprising mechanism having two reciprocating press heads, means guiding them each vertically without rotation, a rotating drive shaft arranged horizontally between them and having intermeshing connection therewith, and a bell crank lever having one end swinging vertically and adapted to be controlled by press head movement, and having its other end swinging horizontally and adapted to control driving mechanism of said press heads.

Signed at New London, Conn., this sixth day of September 1922.

MATTEO E. INFIORATI, Jr.